United States Patent [19]
Lindfors

[11] 3,924,084
[45] Dec. 2, 1975

[54] ARRANGEMENT FOR POWER TRANSMISSION FROM A STATIONARY ELECTRIC CONDUCTOR TO A VEHICLE

[75] Inventor: Olov Halvar Lindfors, Goteborg, Sweden

[73] Assignee: AB Volvo, Goteborg, Sweden

[22] Filed: Dec. 4, 1974

[21] Appl. No.: 529,588

[30] Foreign Application Priority Data
Dec. 4, 1973 Sweden.............................. 7316361

[52] U.S. Cl.................................... 191/45; 191/66
[51] Int. Cl.²......................................... B60L 5/00
[58] Field of Search............ 191/45, 46, 47, 48, 49, 191/50, 59, 59.1, 64, 65, 66, 67, 72

[56] References Cited
UNITED STATES PATENTS
3,823,278   7/1974   Gray..................................... 191/66

*Primary Examiner*—M. Henson Wood, Jr.
*Assistant Examiner*—D. W. Keen
*Attorney, Agent, or Firm*—Young & Thompson

[57] ABSTRACT

A current collecting arrangement for an electrically driven trolley bus or similar comprises antennae detecting the electromagnetic field of the contact wire or a signal wire strung parallel therewith. Signals from the antennae control power means for raising and horizontally swinging an arm supporting the current collector. A control device processes the antennae signals for automatically guiding the current collector into engagement with the contact wire after being disengaged therefrom.

6 Claims, 4 Drawing Figures

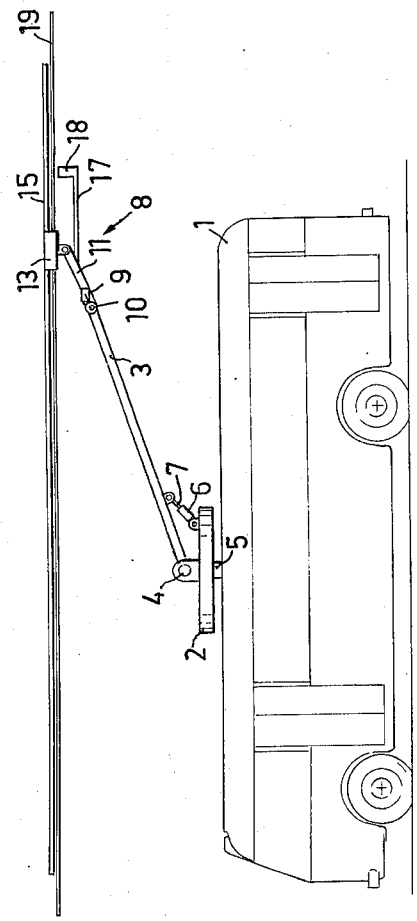
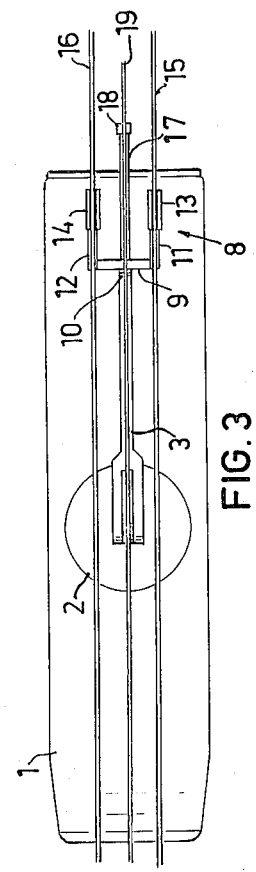
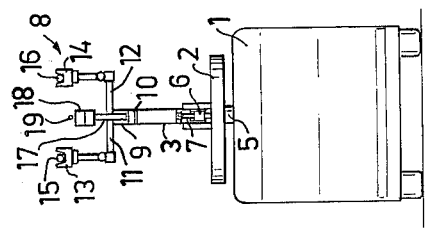

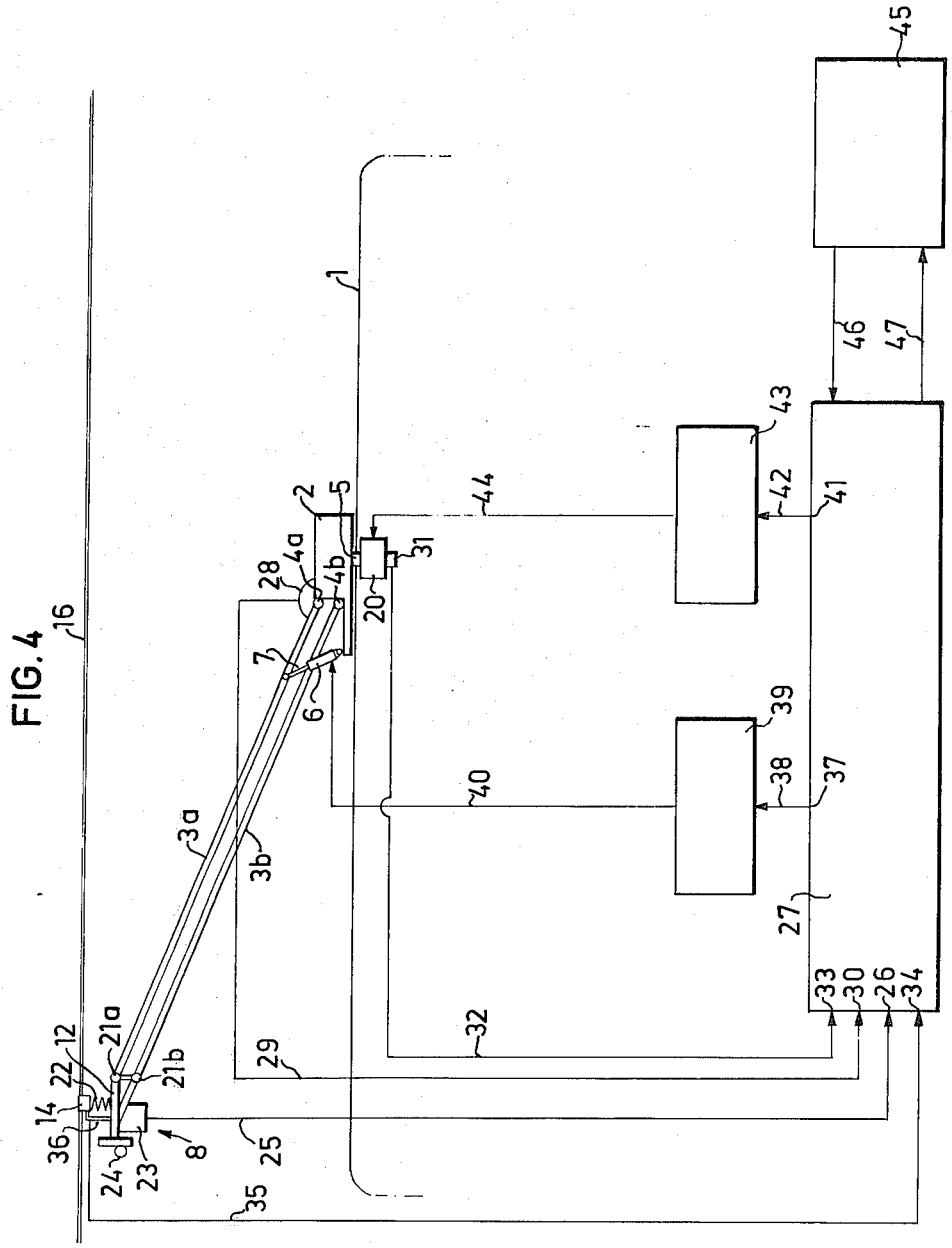

ARRANGEMENT FOR POWER TRANSMISSION FROM A STATIONARY ELECTRIC CONDUCTOR TO A VEHICLE

The present invention relates to an arrangement for making it possible for a vehicle, which is normally driven by an electric current which is transmitted to the same via a stationary electric conductor to a contact means arranged on the vehicle, to temporarily deviate from its traffic route which is determined by the extent of the conductor and to reconnect itself to said traffic route.

Such an arrangement is useful in for example so-called trolley buses which are driven by a current from one or a plurality of conductors or contact cables arranged above the path or traffic route of the bus. Normally, these buses are equipped with a current collector in the form of a sliding contact means or a trolley contact means which is arranged on a pivotable arm system and which allows the bus to deviate sideways several meters from the contact wire.

To be reduced to the, for cost reasons, limited extent of the contact wire in the traffic network entails a restriction of the action radius of the buses. Thus, it is desirable, at least in shorter stretches, for the buses to be able to free themselves from dependence on the contact wire.

This can be achieved by means of the bus, when released from the contact wire, being driven by energy which has been accumulated in for example batteries during the time in which the bus has been connected to the contact wire. It can also be driven by a flywheel or a combustion motor or in some other manner.

A precondition for the possibility of temporary release from the contact wire is that the current collector can, when the bus is to return to the path of the contact wire, be oriented to lie in contact with the contact wire.

The present invention relates especially to an arrangement for electric driving of vehicles in which the vehicle, while being driven along a contact wire, is fed current from the same by means of a current collector which abuts the contact wire and which is connected to the vehicle, said current collector being movable in a restricted manner transverse the driving direction of the vehicle and to and from the contact wire, said vehicle being equipped with an alternative means for driving the vehicle without the supply of current from the contact wire. According to the invention, the arrangement is characterized in that a signal transmitter extends along the longitudinal direction of the contact wire and that the vehicle is equipped with a signal receiver for reception of signals from the transmitter, positioning means in order to cause the current collector to move at least in the transverse direction of the vehicle and control means so as to, in dependence of signals received by the signal receiver, control the positioning means so that, from a position in which the current collector is not in contact with the contact wire, said current collector is brought into abutment with the same. In this manner it is possible to automatically guide the current collector into the contact wire.

The signals which control the positioning of the current collector can be produced by means of an A.C. voltage carried by a separate signal wire arranged parallel with the contact wire. However, the contact wire is preferably used as a signal transmitter as well. When the vehicle is driven by direct current, an A.C. voltage can be superposed on the direct current or a pulsating direct current can be used.

The signal receiver can comprise conventional kinds of antennae, for example the same kind as used to guide or steer an unmanned truck along a guidewire.

The signals from the receiver are fed to a control device which controls positioning means for the current collector. The current collector and the signal receiver can be arranged on an arm system which, by means of the positioning means, is pivoted in the transverse direction of the vehicle and, if desired, vertically. The positioning means can, for example, be hydraulic or electric. If desired, the arm system can be provided with a resilient joint member which absorbs contact wire variations in height. The arm system can also be arranged so that the positioning means are disengaged when the current collector has come into contact with the contact wire and is guided mechanically along the same while the arm system is pushed upwards by spring force.

The positioning of the current collector can be performed semi-automatically so that, when the vehicle leaves the contact wire, the driver can manually, via servo devices, lower the current collector and so that, when the vehicle is driven into the path of the contact wire, the driver can initiate a raising of the current collector, the transverse orientation of said collector being achieved by means of the signals from the signal wire until the current collector has been raised into contact with the contact wire and mechanical guidance along the same. It is also possible to continuously achieve transverse guidance by means of the signal from the signal wire.

When the contact means of the current collector are designed as for example narrow channels so that they must be oriented parallel with the contact wire in order to achieve necessary contact and guidance, the arrangement according to the invention is provided with means for detecting not only the transverse and vertical position of the contact wire, but its longitudinal direction as well, further positioning means for the contact means being arranged so as to turn the contact means to a position lying parallel with the contact wire. These positioning means can either be situated on the current collector in order to rotate only the contact means or they can be arranged in connection with the arm system so as to rotate the whole current collector by means of, for example, a parallel linkage system.

Naturally, in certain uses the contact wire can be arranged at the side of the vehicle or under the same.

The invention is described in more detail below with reference to the accompanying drawings, in which FIG. 1 is a side-view of a bus having a current collector mounted on an arm, said current collector being in contact with contact wires situated above, FIGS. 2 and 3 show the bus and the contact wires according to FIG. 1 as seen from behind and above respectively, and FIG. 4 is a side-view of a current collector on a modified arm and a block plan for illustration of control of the current collector.

FIG. 1 shows a bus 1 having a turntable 2 arranged on its roof, upon which turntable an arm 3 is mounted so as to swing around a horizontal axis 4. The turntable 2 has a hydraulic motor (not shown) for turning the turntable 2 and the arm 3 around a vertical axis 5. One end of a hydraulic cylinder 6 is connected to the turntable 2 and its piston rod 7 is connected to the arm 3. At its free end the arm 3 supports a current collector arrangement 8 comprising a fork member 9 which is connected to the arm 3 by means of a joint 10 having a transverse horizontal axis. The joint is spring-loaded in a manner not shown here so that the fork member 9 is, under spring force, swingable in an upwards direction in a vertical plane through the arm 3.

Alternately, the joint 10 can be deleted and the cylinder 6 or a spring arranged to the same can be used instead in order to push the arm 3 upwards.

The fork member 9 has two symmetrical, backwardly projecting shanks 11,12, the ends of which each support a respective sliding contact shoe 13,14. The sliding contact shoes are channel-shaped and each shoe grasps a respective electric contact wire 15,16. Each contact shoe 13,14 is movably connected to accompanying fork shanks 11,12 and is preferably spring-loaded so that it is pushed into contact with the contact wire.

The fork member 9 is further provided with a central backwardly directed arm 17, the end of which supports a signal receiver 18. In the described embodiment, said receiver 18 is composed of an antenna arrangement in the form of a pair of coils which cross each other (not shown in FIGS. 1–3) which detect the electromagnetic field from an A.C. signal voltage on a signal wire 19 running between the contact wires 15,16.

When the vehicle 1 is being driven along the contact wires 15,16 the turntable 2 is freely rotatable and the hydraulic cylinder 6,7 is positioned so that the sliding contact shoes 13,14 of the current collector arrangement 8 are pushed into contact with the contact wires 15,16 with the help of the spring-loaded joint 10. The sliding contact shoes 13,14 will then be mechanically guided by and follow the contact wires 15,16 as the arm 3 swings around the axis 5 of the turntable 2.

When the vehicle is to deviate from the path of the contact wire further than the arm 3 allows, the driver lowers the arm 3 and continues to drive with the alternate power source of the vehicle. The return to driving under current feed from the contact wire is effected so that the vehicle is driven in under or in the vicinity of the contact wire, after which the driver sends an impulse to a guidance system which automatically guides the current collector into contact with the contact wire. This sequence is described in more detail below in connection with FIG. 4.

FIG. 4 only shows the roof of a vehicle 1 which is provided with a current collector and arm arrangement which, in comparison to the embodiment according to FIGS. 1–3, are modified. Details corresponding to those in FIGS. 1–3 have been provided with the same reference numerals as those in said figures. The turntable 2 is arranged on the roof of the vehicle, said turntable being driven by a hydraulic rotary motor 20. Two arms 3a,3b, one of which is arranged vertically above the other, are, by means of horizontal axes 4a,4b, turnably connected to the turntable 2. The arms 3a,3b are at their outer ends turnably connected to the current collector 8 by means of horizontal axes 21a,21b so as to form a parallelogram linkage system which holds the current collector 8 horizontal in all turning positions of the arm system 3a,3b. Height positioning takes place with the help of the hydraulic cylinder 6,7 connected to the arm 3a. The sliding contact shoes 13,14 are, with the help of their respective spring 22, maintained in contact with the contact wire 15,16 when the vehicle drives along the same.

The current collector 8 supports a signal receiver 23 having cross-laid antenna coils 24 for detection of the electromagnetic field which surrounds the contact wire 16 which in this case is also used as a signal wire. In a vehicle powered by direct current, an A.C. voltage is for this purpose superposed on the direct current of the contact wire or, alternatively, the existing pulsation of the direct current is used. The signal receiver 23 emits a signal on a wire 25, said signal disclosing the transverse position of the current collector 8 in relation to the contact wire 16.

The signal on the wire 25 is fed into a first input 26 of an electronic control device 27. A signal which disclosed the elevation of the arm system 3 is emitted from an arm elevation detector 28 which is mounted on the turntable 2 near the arm 3a, said signal being sent to a second input 30 of the control device 27 via a wire 29. The turntable 2 is connected to an arm side angle detector 31 which emits a signal which discloses the transverse angle position of the arm system 3, said signal being sent to a third input 33 of the control device 27 via a wire 32. Further, a wire 35 from a contact wire height detector 36 is connected to a fourth input 34 of the control device 27, said contact wire height detector 36 detecting the vertical distance between the current collector 8 and the sliding contact shoe 14 which is in contact with the contact wire 16.

The control device 27 has a first output 37 which emits a height control signal through a wire 38 which is connected to the input of an arm elevation servo transmitter 39. In the present example, said transmitter 39 can be designed as a hydraulic valve, from the outlet of which hydraulic liquid is fed through a conduit 40 to the lifting cylinder 6 of the arm system 3. A second outlet 41 in the control device 27 emits, in a corresponding manner, transverse control signals through a wire 42 leading to a side angle servo transmitter 42, which, by means of a conduit 44, is connected to the rotary motor 20.

The vehicle is further provided with manual controls 45 for the driver. These are, by means of wires 46,47, connected to the control device 27 and enable the driver to shut off the automatic function of the control device 27 in order to be able to manually adjust the current collector both vertically and in the transverse position.

When the current collector 8 shall automatically be brought into contact with the contact wire 15,16, the vehicle 1 is, as mentioned previously, driven in under or within the vicinity of the contact wire, the arm system 3 on the roof of the vehicle being in a collapsed position. The driver thereafter raises the current collector 8 to an intermediate position with the help of the manual controls 45, said intermediate position still being situated below the contact wire, after which he activates the control device 27. The control device processes the signals from the signal receiver 23 of the current collector and from the elevation and transverse angle detectors 28 and 31, respectively, of the arm system 3 and emits a signal to the side angle servo transmitter 43 in order to guide the current collector 8 into a position immediately below the contact wire 15,16. When this position has been achieved, the control device 27 sends signals to the arm elevation servo transmitter 39 to raise the arm system 3 until the contact wire height detector 36 informs the control device 27 that the correct height has been reached and the sliding contact shoe 14 has come into contact with the contact wire 16. The driver can thereafter shut off the control device 27 and let the current collector 8 lie in contact with the contact wire 15,16 only by means of spring pressure and mechanical guidance. Alternately, the control device 27 can be kept in operation and, with the help of detector means 24,36,28 and 31 and lifting and rotary motors 6,20, guide the current collector 8 along the control wire.

It is also possible to double up the antenna equipment 24 in order to detect both of the contact wires 15,16 whereby information concerning height can also be obtained.

In the example described in connection with FIG. 4, it has been assumed that the contact means 13,14 do not need to be oriented parallel with the contact wire 15,16 when being connected to the same. However, if the contact means are designed as narrow channels according to FIGS. 1–3, it is also desirable to be able to automatically direct the contact means parallel with the contact wire so that they grasp or engage with the same in the intended manner when the current collector is being raised. This can be achieved for example with the help of a second set of antennae similar to antennae 24 and placed at a distance from said first antennae in the longitudinal direction of the current collector 8. The signals from the two pairs of antennae are compared in the control device which, in the event of different signal strengths indicating an oblique position of the current collector in relation to the contact wire 16, emits a control signal to a further positioning means which swings or turns the contact means into a parallel position in relation to the contact wire. The further positioning means can be situated on the current collector 8 and turn the contact means 13,14 in relation to the same or it can be arranged in connection with the arm system 3 and turn the whole current collector 8 in relation to the vehicle 1.

Even if the shown example relates to trolley buses, the invention is, naturally, also useful and applicable in other vehicles.

It is also possible to let the arm side angle detector 31 detect an excessive side angle of the arm 3. When a predetermined angle is exceeded, the control device 27 gives the arm elevation transmitter 39 an order to lower the arm. In this way the vehicle driver does not have to manually lower the arm when leaving the path of the contact wire. Damages to the contact wire are also avoided.

What I claim is:

1. An arrangement for the transmission of electric power from a stationary electric conductor to a vehicle, whereby the vehicle, when driven along a contact wire, is supplied with current from the same by means of a current collector which is connected to the vehicle and lies in contact with the contact wire, said current collector being movable in a restricted manner in the transverse direction of the vehicle and to and from the contact wire, said vehicle being provided with alternative means of driving the vehicle without current supply from the contact wire, characterized in that a signal transmitter extends along the longitudinal direction of the contact wire and that the vehicle is provided with a signal receiver for receiving signals emitted from the signal transmitter, positioning means for moving the current collector at least in the transverse direction of the vehicle and a control device for controlling, in dependance of signals received by the signal receiver, the positioning means so that the current collector can, from a position in which it is not in contact with the contact wire, be brought into contact with said contact wire.

2. An arrangement according to claim 1, characterized in that the contact wire forms the signal transmitter.

3. An arrangement according to claim 2, characterized in that, in a vehicle driven by direct current, the signals are formed by an A.C. voltage which is superposed on the direct current.

4. An arrangement according to claim 1, characterized in that the signal transmitter comprises a signal wire which is arranged parallel with the contact wire.

5. An arrangement according to claim 1, characterized in that the current collector and the signal receiver are arranged on an arm system which is carried by the vehicle and which can be swung both vertically and in the transverse direction in relation to the vehicle.

6. An arrangement according to claim 1, characterized in that a further signal receiver is arranged at a distance from the first-mentioned signal receiver and is also arranged to receive signals from the signal transmitter; that the current collector is provided with a contact means which, in the operating position, assumes a predetermined orientation in relation to the contact wire; that turning means are arranged to adjust the angular position of the contact means in relation to the vehicle and that control means are arranged to control the turning means with the help of signals from the two signal receivers so that the contact means are adjusted to the predetermined orientation.

* * * * *